INVENTOR:
MICHAEL VAMVAKAS

United States Patent Office 3,346,094
Patented Oct. 10, 1967

3,346,094
CONTAINER LOADER APPARATUS
FOR WASHERS
Michael Vamyakas, Rocky River, Ohio, assignor to Barry-Wehmiller Company, St. Louis, Mo., a corporation of Missouri
Filed Mar. 10, 1966, Ser. No. 533,184
10 Claims. (Cl. 198—25)

This invention relates to improvements in loader apparatus for transferring containers from a feeder conveyor where they are in normal upright position by laying the containers over substantially in a horizontal position and moving the containers to the pockets in the conveyor adapted to carry the containers through a washer.

The problem in feeding containers into washer apparatus is one in which the containers must be precisely timed to enter the pockets of the washer conveyor at a maximum rate, while avoiding jamming the washer, causing breakage of the containers which are usually glass or some frangible material, and being able to accomplish the transition with multiple rows of containers since the washer is provided with multi-row pocket conveyors. The containers must be handled automatically, gently and must be turned from a vertically erect position to a substantially horizontal position in order to be loaded at the station where the pockets of the washer conveyor are caused to move in a generally vertical path just prior to entry into the washing cycle. The requirement for positive loading of the washer pockets and to be assured of a full complement of containers in each row of pockets is essential to the full and economical operation of the washer. The chance of container breakage is, of course, great where it is necessary to change the position or attitude of a large number of containers in multiple rows. Therefore, it is a further problem to control the container positions, prevent overcrowding during the transition from a scrambled group of containers to an orderly array, and maintain simplicity of the various parts and components of the apparatus.

With these and other problems and requirements in view, it is an object of this invention to provide container loader apparatus with positive container handling means of simple construction and operation suitable for use with present day washer machines having multi-rows of conveyors for receiving ranks of containers simultaneously.

It is also an object of this invention to provide container transition means coupled between a feeder conveyor and the loading station of a washer and to coordinate operation of the transition means with the movement of the washer conveyor system.

Another object of this invention is to provide transition means of novel and simple form which will handle a multi-rank flow of containers equal to the demands of high capacity washer machines.

A further object of this invention is to provide a rotary type transition means for handling ranks of containers in a smooth and gentle flow, and one in which the containers are positioned in an optimum attitude for loading in the washer machines rapidly and positively.

Still another object of this invention is to provide improved means for arranging a scrambled supply of containers in orderly rows and transferring successive ranks of such containers from the orderly rows into ranks of pockets in multi-row conveyor means in a washer or other container processing machine.

Yet a further object of this invention is to provide transition means between a source of supply of containers and a container processing machine, and to regulate the transition means so that successive ranks of containers will be quickly moved to and deposited in the processing machine without substantial interference with or impairment of the operation of the latter machine so that high capacity may be maintained.

Other objects of the present invention are to provide unique components and parts for carrying into practice the foregoing and other objects.

The container loader apparatus for washers will be hereinafter shown and described in a presently preferred embodiment, the form and details of which are shown in the accompanying drawings, wherein:

FIGURE 5 is an enlarged fragmentary detail view of the belt means employed in the present apparatus; and FIGURE 6 is a schematic wiring diagram of a control system incorporated in the present apparatus.

Before setting forth the details of the preferred embodiment, it should be noted that the current washer apparatus of high capacity are wide so that many rows of container receiving pockets can be accommodated. In order to simplify the following description, it will be understood that rows of containers will generally refer to alignment of containers in a direction lengthwise of the apparatus, while ranks of containers will generally refer to containers in side by side alignment but moving longitudinally of the apparatus. With this understood it will then greatly simplify the drawings and description by eliminating a number of views showing the width of the apparatus.

Figure 1:
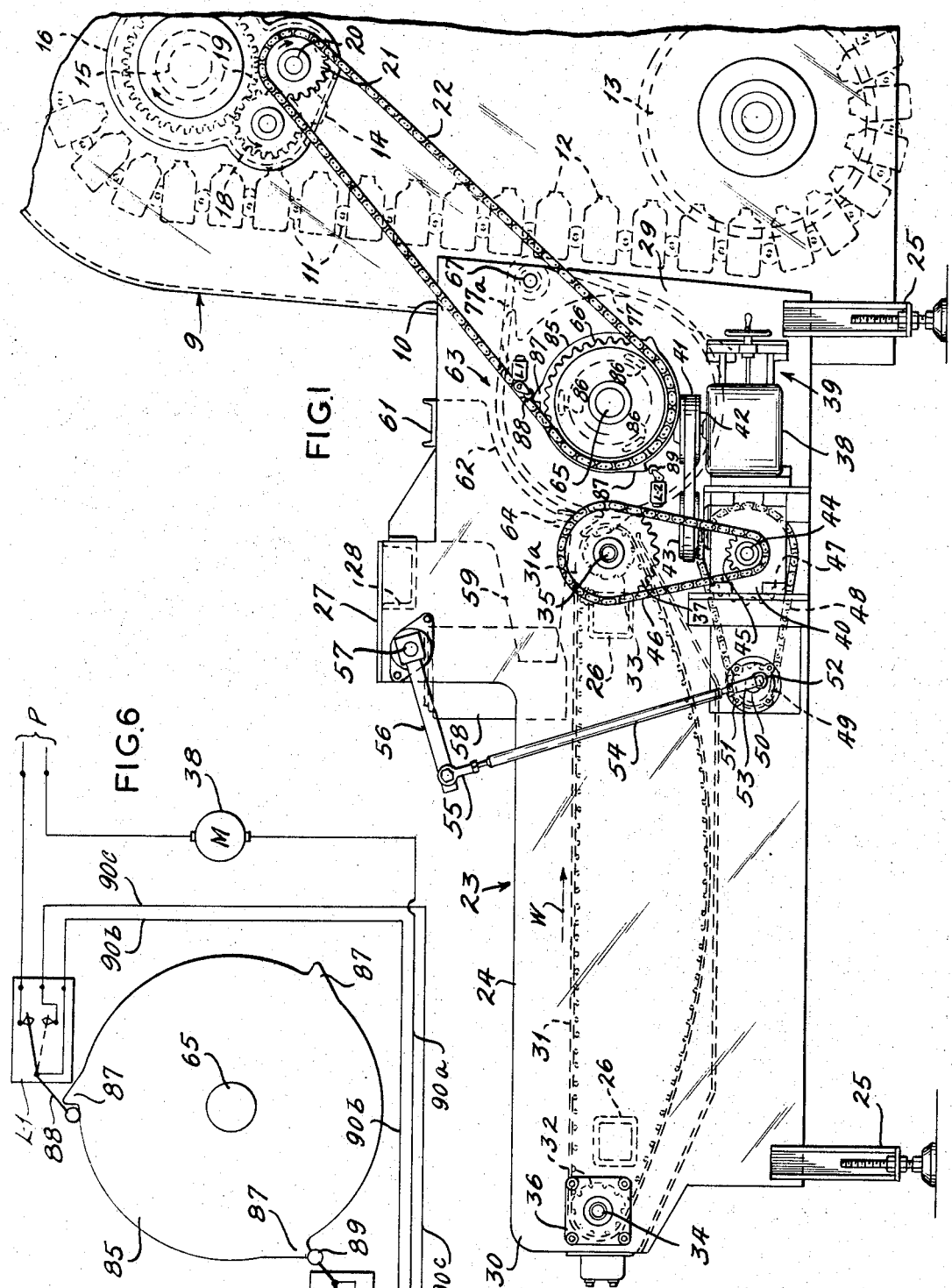
FIGURE 1 is a longitudinal elevational view of the container loader apparatus positioned at the receiving end of a container washer which is shown in fragmentary outline.

Turning now to FIGURE 1 of the drawings, and to other views thereof as the same may be pertinent, it can be understood that the container washer is represented by the general casing 9 in which an opening 10 is provided. Within the casing 9 is suitably mounted a conveyor system comprising a plurality of conveyor means 11 (only one being seen) with pockets 12 thereon trained over a lower idler sprocket 13 located close to the opening 10 and moving upwardly across the opening 10 to a drive sprocket 14. The sprocket 14 is carried on a shaft 15, and at the near end of the shaft 15 there is a gear 16 enclosed by a housing 17. An intermediate gear 18 rotatably carried by housing 17 meshes with the gear 16 and with a driven gear 19 on shaft 20. Shaft 20 carries a sprocket 21 over which is trained a chain 22, the purpose for which will presently appear.

The container loader apparatus generally indicated at 23 includes a suitable frame having spaced side panels 24 (the near side being seen) supported by suitable legs 25 at its opposite ends. The spaced side panels 24 are structurally connected by cross members 26 and a service catwalk 27 carried by a channel 28. The panels 24 have forward portions 29 which fit into the opening 10 of washer casing 9, so that certain operating components in the loader will be close to the path of movement of the chains 12. Also the containers can be quickly placed in the pockets 12 as there is a greatly reduced distance to be traversed. The panels 24 extend outwardly to the container receiving ends 30. A plurality of container plate-type conveyor chains 31 (two chains being shown in FIGURE 4) are supported between the panels 24 on sprockets 32 and 33, the sprockets being operably mounted on shafts 34 and 35 respectively. The shafts 34 and 35 are supported by suitable bearings, one being shown at 36. The shaft 34 is an idler and shaft 35 extends outwardly of one panel 24 and supports a sprocket 37 for driving the conveyor chains 31 in the direction of arrow W for moving a supply of containers, such as bottles B shown in FIGURE 2.

The drive for the conveyor chains 31 includes a motor 38 carried on a suitable frame 39 attached to the panel 24. The motor 38 drives a reduction gear unit shown at 40 through a belt 41 trained over motor pulley 42 and a pulley 43 for the unit 40. A drive shaft 44 on unit 40 has an outside sprocket 45 which, in turn, drives a chain 46 trained over sprocket 37. Inside panel 24 there is a second sprocket 47 on shaft 44 driving a chain 48 coupled to a sprocket 49 on shaft 50 carried in bearing 51. The shaft 50 has an eccentric or off-set lug 52 to which is connected one end 53 of an oscillating link 54. The opposite end 55 of link 54 operates a second link 56 which is connected to a shaft 57 carried between the side panels 24, just under the cat-walk 27. Shaft 57 carries a plurality of oscillating fins 58 which are spaced across the width of the apparatus 23 to break up the scrambled flow of containers and guide the containers in rows between the fixed guides 59. Guides 59 are supported from the cross channel 28 at brackets 60 and the spacing of guides 59 is further fixed by a suitable cross brace member 61. Guides 59 are formed with a curved lower edge 62 to clear a container transition drum assembly 63 presently to be described in connection with FIGURES 2 and 3. Guides 59 support a pair of angularly formed container stop elements 64. (See FIGURE 4.)

The transition drum assembly 63 (FIGURES 1, 2 and 3) is operably carried on a shaft 65 bearing in and extending between the side panels 24, adjacent the end 29. The drum assembly is caused to rotate on an axis parallel with the container ranks by chains 22 driving a sprocket 66 on shaft 65 outside the near side panel 24. The rotary drum assembly 63 passes under the curved edges 62 of the container guides 59 so as to carry the containers from the chain conveyor 31 to the washer conveyor pockets 12 and fill successive ranks of pockets. Adjacent the drum assembly 63 is an idler shaft 67 bearinged in the panels 24 and carrying a plurality of belt pulleys 68 of small diameter in relation to the diameter of the drum assembly. It is now seen that the drum assembly 63 is driven in timed relation with the washer conveyor chains 11 by the chain 22, but the container feed conveyor chains 31 are driven from motor 38 which is independent of the washer. A simple control system is utilized to bring the apparatus into proper coordination for container transition from conveyor 31 to conveyor pockets 12 in successive ranks. The control system will be described presently.

Figure 2:
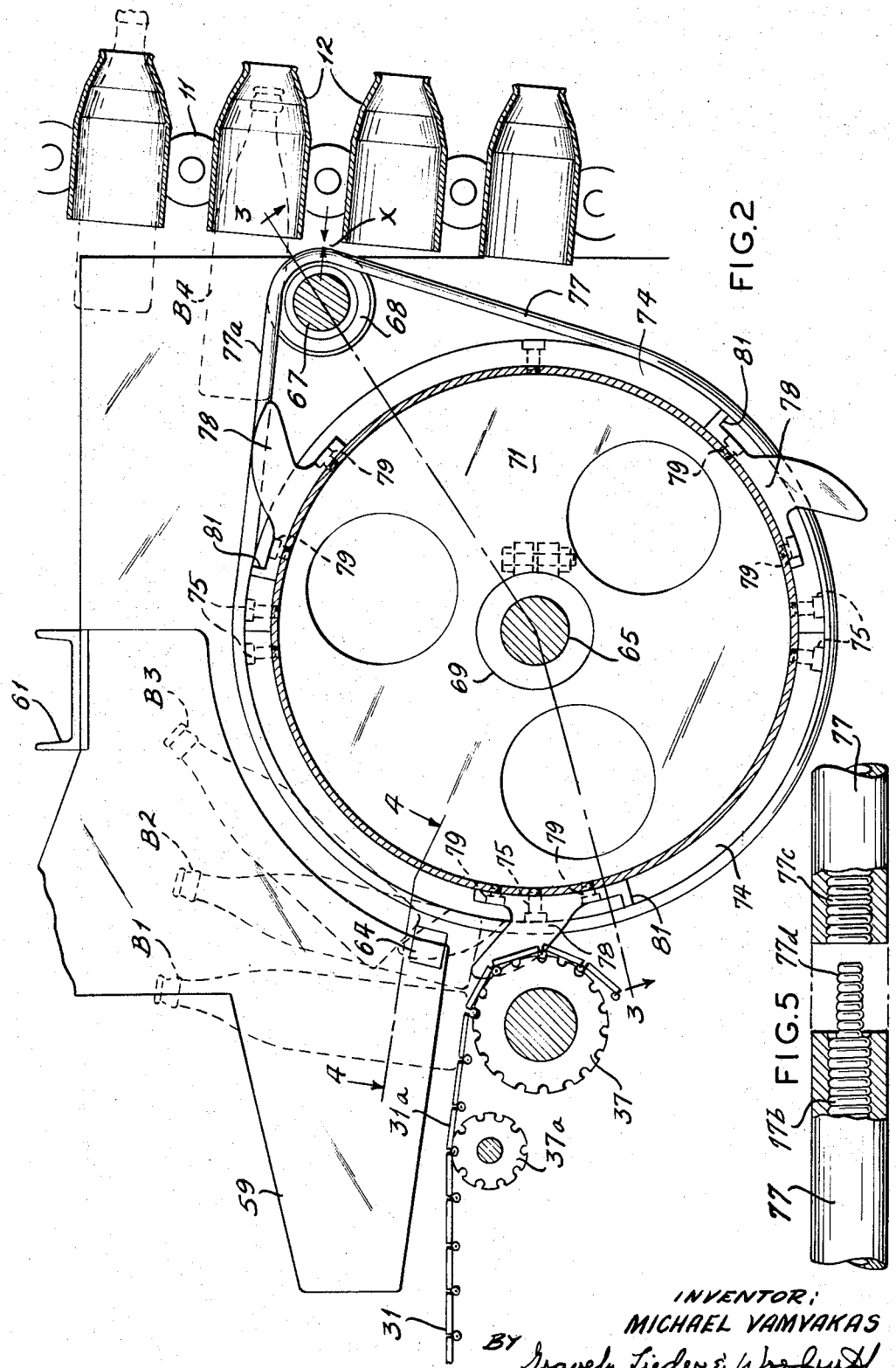
FIGURE 2 is a longitudinal sectional elevation of the apparatus on an enlarged scale to better reveal the details thereof.
Figure 3:
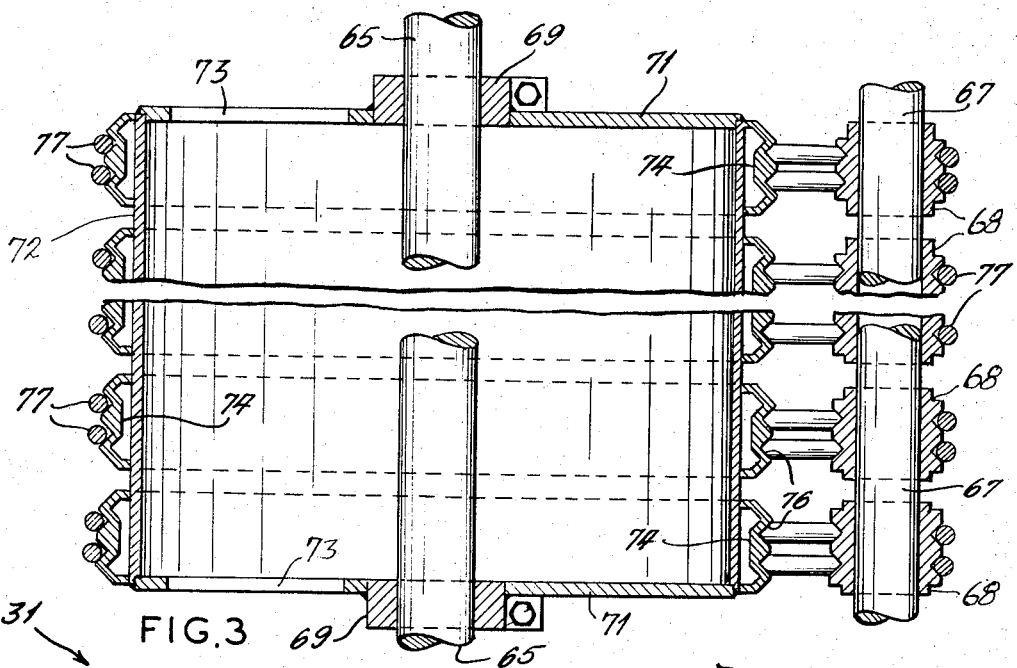
FIGURE 3 is a fragmentary sectional view taken at line 3—3 in FIGURE 2.

Turning now to FIGURES 2 and 3, the rotary drum 63 is composed of hubs 69 clamped on shaft 65 by the ears 70. The hubs 69 are spaced along shaft 65, and each secures a disc 71 on the shaft. The discs support a cylindrical member 72 so that a drum is formed having holes 73 in its disc to reduce weight. The cylindrical member 72 carries a series of spaced rings 74 made in two parts and secured by means 75 at the adjacent ends (FIG. 2) and at other points. Each ring has a pair of V-shaped notches 76 to be engaged by belts 77. As noted, the spacing of ring members 74 for the axial length of the number 72 is so that container lift finger (FIGURES 1, 2 and 4) 78 can be mounted therebetween and secured to the surface of the member 72 by means 79. The lift fingers 78 each have a base 80 adapted to fit into the space between rings 74, and the fingers 78 are evenly spaced arcuately about the drum assembly. As seen in FIGURE 2, there are three such fingers.

Following closely behind each container lift finger 78, and formed as an integral part of the base 80 is a shelf element 81 arranged with a wing 82 (FIG. 4) on each side of the path traversed by the fingers 78. The wings 82 of the shelf elements cooperate to engage the mouth ends of any fallen containers (as bottles) and lift the same to a position where the next finger becomes effective to transfer the container with the aid of the two most adjacent belts 77, which cradle the container therebetween. The chances of a container falling is not very great, but there is such a possibility as the conveyor 31 has a terminal portion 31a of its length inclined downwardly from the idler wheel 37a to the sprocket 37. The inclined portion 31a is, however, effective to break the container apart and minimize jams, along with the oscillatory guides 58 previously described.

Figure 4:
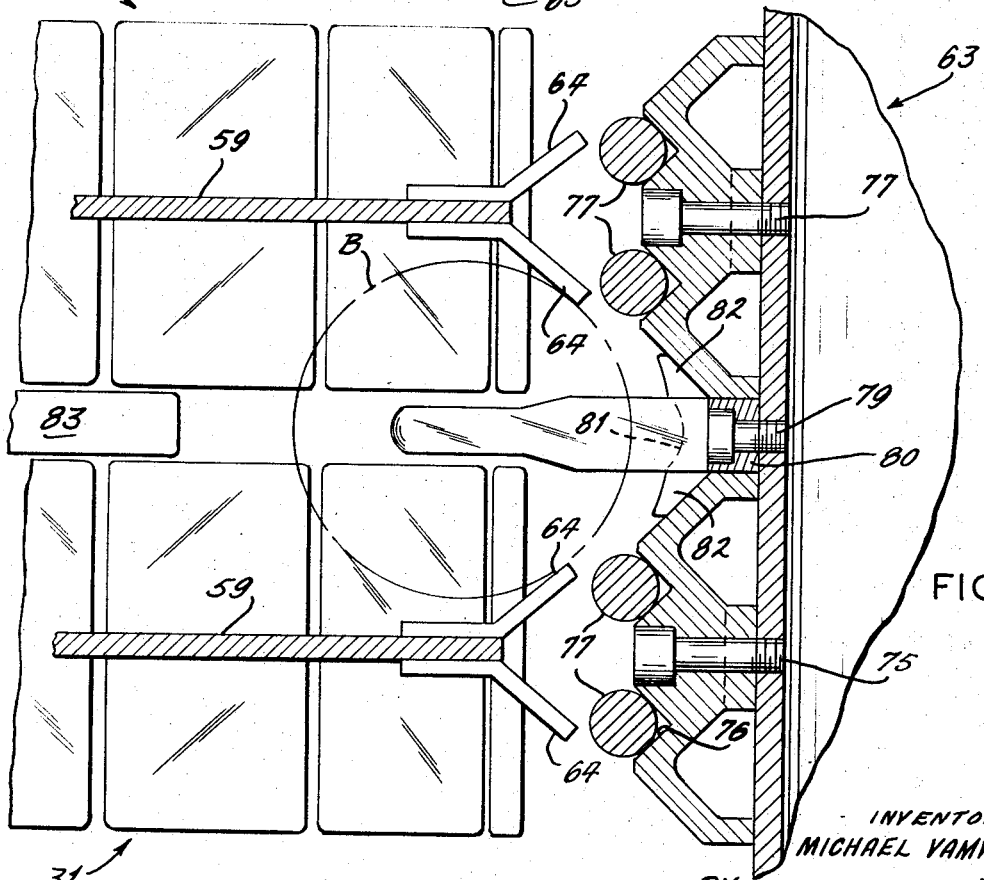
FIGURE 4 is a further fragmentary sectional view taken at line 4—4 in FIGURE 2.

As shown in FIGS. 2 and 4, the containers B are guided by fixed guides 59 into rows with the containers straddling two adjacent conveyors 31. A filler strip 83 may be mounted between adjacent conveyors if desired. This conveyor arrangement allows space between conveyors 31 to accommodate the free upward passage of fingers 78 to engage the bottom of each container. It is shown in FIG. 4 that the container B had advanced until it is stopped and substantially centered by the stop elements 64 so that its body is free of contact with the belts 77 to avoid premature container movement. The finger 78 extends outwardly to engage the container bottom beyond its center, thereby initiating further tilting beyond that caused by the slant of the terminal portion 31a on the conveyor 31. The stops 64 are rather short in the circumferential direction of drum 63 so that the container quickly leaves the stops and assumes a fully cradled rest position on the belts 77. The friction developed by the material (rubber or its equivalent) of belts 77 is initially positively assisted by each finger 78 as the container advances from its starting position B1, as indicated in FIG. 2, to its lift position B2, to its lay-over position B3, and finally to its loading position B4 where the finger 78 just breaks contact after the mouth (at least) of the container has entered the pocket 12.

In FIGURE 2, the belts 77 are trained over idler pulleys 68 on shaft 67. The shaft 67 is located close to the ends 29 of the panels 24 so that the turn in the belts 77 caused by the idler pulleys brings the belts almost into tangency contact with the open ends of each pocket, the spacing X being slightly more than working clearance. In addition to bringing the belts 77 up close to conveyor pockets 12, the location of shaft 67 below the top line of the drum assembly 63 imparts a downward slant in belt spans 77a which aids in maintaining a driving friction engagement between container and belts after the fingers have passed the point of last contact (as seen in FIGURE 2). The belts thereby generate the last thrust on the containers to carry each one home into the pockets 12, and the final distance from the point where finger 78 loses contact to the pocket 12 is kept as short as possible.

In FIG. 6 there is shown a simplified control circuit associated with motor 38 so that the conveyor means 31 can be successively started and stopped to meet the timing cycle of container pick-up and loading to be obtained from the drum assembly 63. The conveyor 31 therefore must be coordinated with the drum, and a way of doing this is to mount an adjustable timing cam 85 (FIG. 1) on shaft 65 and to form slots 86 therein to give a range of angular adjustment so that the cam lobes 87 can be shifted as needed. A start switch L1 is mounted in a fixed position as shown in FIG. 1, so that its feeler arm 88 will be in the path of lobes 87. A stop switch L2 is mounted in a fixed position so its feeler arm 89 can respond to lobes 87. The switch L1 is wired in series with switch L2 and motor 38 so that the electrical power source P is directly controlled. Switch L1 can be of the toggle type that is actuated between one of two circuit positions each time the feeler is given a stroke by a cam lobe. Switch L2 is a similar type switch but is set to make a different circuit of the 3-wire hook-up 90 from that made at switch L1. Thus, switch L1 can make a circuit through wires 90a and 90b, and switch L2 when set as shown. The lobe 87 near L1 (FIG. 6) after actuating L1 is followed shortly by lobe 87 near L2 actuating L2 to open the circuit of wires 90a and 90b and set circuit wire 90b in make position with the third wire 90c. This stops motor 38 until the next succeeding lobe 87 actuates feeler 88 to make circuit 90b and 90c and start the motor again. This is again shortly followed by feeler 89 at L2 breaking the circuit to stop motor 38. In this way, the motor 38 is given short "on" pulses which moves the conveyor 31 in a step by step sequence to advance the containers.

In FIGURE 5 there is shown one typical way in which the belts 77 are joined at the butted ends. Each belt is formed of rubber or other flexible material having a friction surface characteristic, and being tubular or other shape. Each open end of the belt tube is equipped with a flexible spiral track which may consist of a coil spring element 77b and 77c, the track or spring 77c having a spiral or twist opposite to the track or spring 77b. The two springs 77b and 77c are securely embedded and have a length sufficient to more than sustain the tension stresses developed in service. A flexible coupler means or spring 77d is threadedly inserted in the central bore of each spring 77b and 77c to mechanically connect the ends of the belt. The use of springs preserves the flexibility of the belt for ease of negotiating a small radius provided by the idler pulleys 68.

It can now be appreciated that the present apparatus carries out each and every object hereinbefore set out, and it is the aim to include the same or equivalent components and parts within the spirit and scope of the appended claims.

What is claimed is:

1. In a container loader mechanism for feeding a container take-away pocketed conveyor system, the combination comprising: a rotary member spaced from the pocketed conveyor, an idler member spaced to one side of said rotary member and positioned adjacent said pocketed conveyor, friction belt means trained over said rotary and idler members and having a delivery pass forming a path of movement for containers to be delivered to the pocketed conveyor, a container supply means adjacent said rotary member on the side opposite from the pocketed conveyor, elements on said rotary member spaced about the periphery and projecting past said belt means in positions to pick up successive containers and move the containers onto said friction belt means, said elements causing the containers to move into the delivery pass of said belt means, means driving said rotary member to effect movement of said belt means to transport the container past the position of said idler member and into the pocketed conveyor, and stop means adjacent said container supply means in position to hold each container out of contact with said friction belt means until said elements on said rotary member pick up the containers from said container supply means.

2. The loader mechanism set forth in claim 1 wherein said belt means comprises a pair of belts spaced apart to cradle containers therebetween, and said elements on said rotary member are fingers projecting radially outwardly between said pair of belts.

3. The loader mechanism set forth in claim 1 wherein motor means is operably connected to drive said container supply means, and control means is operably connected to said motor means to impart successive pulses thereto for advancing containers toward said rotary member step by step.

4. The loader mechanism set forth in claim 1 wherein the rotary member is continuously rotated by said driving means, motor means is operably connected to drive said container supply means, and control means is operably connected between said rotary member and said motor means to impart successive pulses thereto for advancing containers toward said rotary member step by step to prevent jamming containers against said rotary member.

5. The loader mechanism set forth in claim 1 wherein each container pick-up element is followed in the rotation of said rotary member by container lifting elements which back up said pick-up element in the event a container is missed by said pick-up element.

6. In a container loader for a pocketed conveyor system, the loader comprising: a rotary member spaced from the pocketed conveyor system, an idler member between said rotary member and the pocketed conveyor system; endless friction belt means trained over said idler member and about said rotary member and having a container cradling pass directed along a downward incline by said idler member toward the pocketed conveyor system; container supply conveyor means having a discharge end adjacent said rotary member; stop means adjacent said conveyor discharge end and spaced from said friction belt means, said stop means arresting the containers prior to engagement with said friction belt means; and container engaging finger elements spaced about the periphery of said rotary member and projecting outwardly beyond said friction belt means to engage the containers arrested by said stop means at the conveyor discharge end, said finger elements moving successive containers onto said friction belt means from said stop means.

7. A container loader according to claim 6 and including fixed guides adjacent said stop means to direct containers in an orderly file to said stop means, and movable members cooperating with said fixed guides in positions to unscramble container flow to said stop means.

8. A container loader according to claim 6 including shelf elements carried by said rotary member in follow-up positions to said finger elements, said shelf elements engaging a fallen container and restoring it to normal position.

9. A container loader according to claim 6 including means to avoid following containers pressing upon a container arrested by said stop means, said last means including motor means operating said container supply conveyor to bring containers into said stop means, control means on said rotary member sensitive to the container pick-up cycle of said finger elements, and an electrical circuit responsive to said control means and connected to said motor means to establish successive motor starting and stopping periods timed to said container pick-up cycle of said finger elements.

10. A container loader according to claim 6 including means joining the ends of each friction belt means to make the same endless, said joining means comprising flexible spiral track means in each end to be joined, and flexible coupler means engaged in said spiral track means to effect a tension resistant joint that is flexible in bending.

References Cited
UNITED STATES PATENTS

| | | | |
|---|---|---|---|
| 2,757,778 | 8/1956 | Lyons | 198—25 |
| 3,220,532 | 11/1965 | Vamvakas | 198—22 |

EVON C. BLUNK, *Primary Examiner.*

RICHARD E. AEGERTER, *Examiner.*